United States Patent [19]
Daumueller et al.

[11] 3,809,880
[45] May 7, 1974

[54] ILLUMINATING UNIT FOR USE ON MOTOR VEHICLES

[75] Inventors: Hans Daumueller, Marbach; Heinz Kretschmer, Hofen, both of Germany

[73] Assignee: Robert Bosch GmbH, Stuttgart, Germany

[22] Filed: Mar. 20, 1973

[21] Appl. No.: 343,144

[30] Foreign Application Priority Data
Mar. 23, 1972 Germany............................ 2214161

[52] U.S. Cl...................... 240/8.2, 240/57, 340/93
[51] Int. Cl. ...................... F21v 21/00, B60g 1/00
[58] Field of Search ........... 240/7.25, 8.1, 8.2, 8.22, 240/8.3, 57; 340/87, 89, 93

[56] References Cited
UNITED STATES PATENTS
| | | | |
|---|---|---|---|
| 3,603,928 | 9/1971 | Speedy et al..................... | 240/8.1 R |
| 3,456,153 | 7/1969 | Smith............................... | 340/89 X |
| 2,876,430 | 3/1959 | Scherenberg..................... | 340/87 X |
| 3,491,336 | 1/1970 | Anderson.......................... | 340/87 X |
| 1,809,243 | 6/1931 | Kirk.................................. | 340/89 |

FOREIGN PATENTS OR APPLICATIONS
1,480,378  10/1969  Germany ............................. 340/89

Primary Examiner—Joseph F. Peters, Jr.
Attorney, Agent, or Firm—Michael S. Striker

[57] ABSTRACT

An illuminating unit which is particularly adaptable for use on motor vehicles has a housing including a wall which is at least partly transparent. Reflectors in the housing reflect light to the transparent parts of the wall, the reflected light then travelling to the exterior of the housing. A single filament in the housing is so positioned that light emitted thereby impinges on the reflectors and is reflected to all transparent parts of the wall.

12 Claims, 1 Drawing Figure

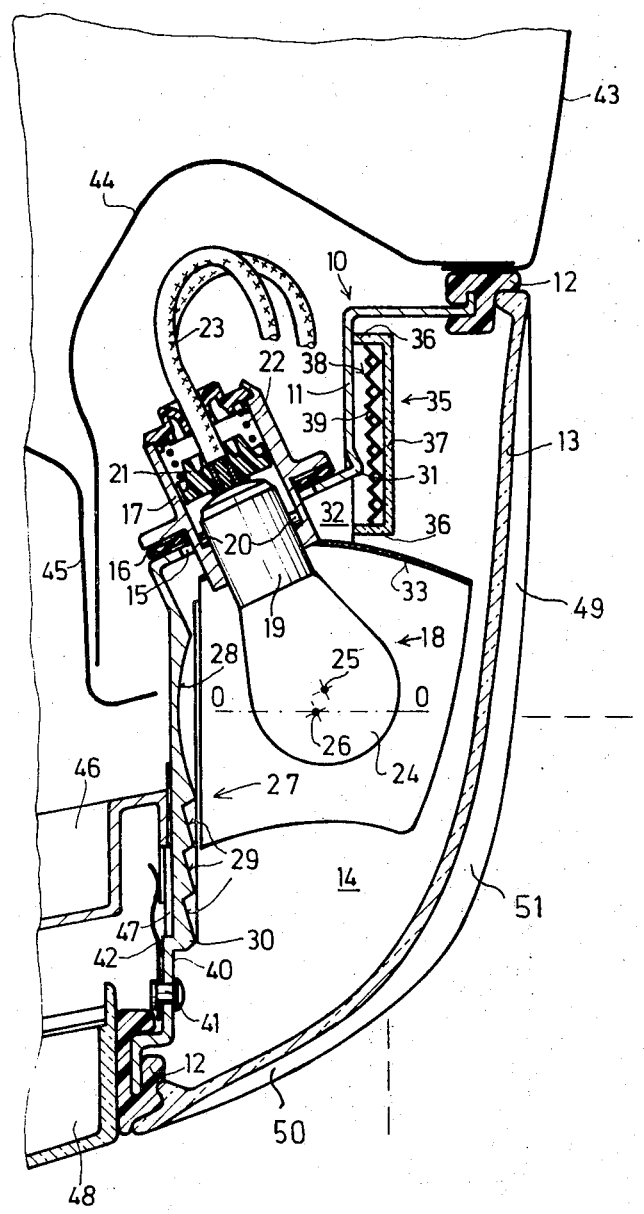

ILLUMINATING UNIT FOR USE ON MOTOR VEHICLES

BACKGROUND OF THE INVENTION

This invention relates generally to illuminating units and, more particularly, to illuminating units having a housing which may be mounted on a motor vehicle, especially the front end of the vehicle chassis, and/or to a support structure. The illuminating units under discussion are of the type wherein a reflector is provided in the housing, and wherein at least one source of illumination for the parking lights of the motor vehicle and at least one source of illumination for the side lights of the motor vehicle are also provided in the housing.

Motor vehicles to be used in the United States are now required to have a side light and a side reflector at each of the four corners of the vehicle. In the known illuminating units, of which one is arranged at each corner of the vehicle and which provides the respective parking and side lights as well as providing the respective blinking signal light, only the light sources for the parking light and the blinker, at most, are located within one and the same housing, usually in the form of a two-filament bulb, whereas the side reflector and the light source for the side light are located separately therefrom. Furthermore, the side reflector is often interposed between the light source for the side light and the exterior of the vehicle and must, therefore, be provided with transparent portions in order to permit light from the source of the side light to travel to the exterior of the vehicle. The side reflector must also be provided with refracting or reflecting portions so as to enable it to reflect light impinging thereon from exteriorly of the vehicle.

Already known is an illuminating unit with a housing and a two-filament bulb, which is combined with an installed headlamp and, together with this, forms a complete headlamp unit. Here, one of the filaments provides illumination for the parking light and the other of the filaments serves as a source of blinker light. However, the side light and the side reflector are secured to the chassis at a location different from that of the headlamp unit. Thus, the known illuminating units require at least two housings, one for the sources of illumination of the parking light and the blinker and another for the source of illumination of the side light. Also, in the known illuminating units, each filament serves as a source of illumination for one of the lights only. In addition, the side reflector is usually located exteriorly of the housing provided for the source of illumination of the side light.

SUMMARY OF THE INVENTION

It is, accordingly, an object of the invention to provide an illuminating unit which does not require separate housings for the sources of illumination of the parking light and blinker and for the source of illumination of the side light.

Another object of the invention is to provide an illuminating unit wherein a single filament may serve as a source of illumination for more than one light.

In accordance with these and other objects, the invention provides an illuminating unit, particularly for use on motor vehicles, which comprises a housing a wall with at least two substantially transparent portions. Reflector means in the housing is provided in order to reflect light to at least these transparent portions, through which the reflected light then travels to the exterior of the housing. Light emitting means is also provided in the housing and includes a single light emitter which is positioned in such a manner that light emitted thereby impinges on the reflector means and is reflected thereby to at least the transparent portions of the wall of the housing.

Thus, the principles of the invention allow a single filament to serve as a source of illumination for both a parking light and a side light of a motor vehicle. An advantageous arrangement arises when, in a modified form of the invention, a two-filament bulb provides all of the sources of illumination for the various lights, e.g. the sources of illumination of the parking light, the side light and the blinker light. In such an arrangement, one of the filaments serves to illuminate the parking and side lights and the other filament serves as a source of blinker light.

In a further modification of the invention, the necessity for securing the side reflector to the vehicle at a location different from that of the various lights and their sources is eliminated by placing the side reflector inside the housing of the illuminating unit. Furthermore, in order for the intensity of the side light to be sufficiently great, it was heretofore necessary to supply a discrete reflector for reflecting outwardly the light emitted by the source of the side light and to secure this reflector separately to a base support. Thus, in a preferred form of the invention, the need for such a discrete reflector is eliminated by having a section of the housing wall constitute the reflector means, at least in part. In this regard, it is advantageous when a portion of this wall section is provided with steps or, in other words, when a portion of this wall section is discontinous rather than smooth.

Also, in the known illuminating units, the side reflector is interposed between the source of illumination for the side light and the exterior of the vehicle and, therefore, it is necessary for these side reflectors to be provided with transparent portions so that the light emitted by the source of illumination may travel to the exterior of the vehicle. However, when, in accordance with the invention, the side reflector is placed inside the housing of the illuminating unit, it is positioned at a location which is at least somewhat remote from the sources of illumination of the parking, side and blinker lights so that it is not interposed between these sources and the exterior of the vehicle. Consequently, it is not necessary for the side reflector to be partly transparent and, as a result, its total surface area may be smaller than was possible heretofore. In addition, the perforated backing which it was, until now, necessary to sealingly connect with the side reflector, may be eliminated when, in another preferred modification of the invention, the rear surface of the side reflector, i.e. that surface of the side reflector remote from the exterior of the vehicle, is silver-coated, for example, by vapor-deposition.

One of the advantages of the invention resides in the fact that all of the sources of illumination for the various lights are accommodated within a single housing so that a considerable saving of space is realized. There is also the advantage that the side reflector may be of simple design. Furthermore, the elimination of a separate housing for the source of illumination of the side light has the result that, concomitantly, the mounting required for such a housing, the lead wires required for the source of illumination in the housing, a separate bulb for the housing and, likewise, a separate circuit for the housing, are all eliminated.

The novel features which are considered as characteristic for the invention are set forth in particular in the appended claims. The invention itself, however, both as to its construction and its method of operation together with additional objects and advantages, will be best understood from the following description of specific embodiments when read in connection with the accompanying drawing.

BRIEF DESCRIPTION OF THE DRAWING

The single FIGURE is a horizontal cross-section through an illuminating unit according to the invention which is shown mounted on the front end of a motor vehicle.

DESCRIPTION OF THE PREFERRED EMBODIMENTS

Referring to the single FIGURE, an illuminating unit in accordance with the invention is shown mounted on a motor vehicle for the sole purpose of clearly illustrating the invention and not for limiting the applications of the novel illuminating unit to uses on motor vehicles only. In this illustration, the illuminating unit is mounted on the left front of the vehicle, as considered from the driver's position. This is made clearer by the arrows R and LS which, respectively, indicate the location of the rear of the motor vehicle and the left side thereof. For the sake of clarity, only portions of the chassis are shown. These include an outer plate 43 extending along the left side of the vehicle, an arcuate support member 44 and a supporting element 45.

The FIGURE represents a horizontal cross-section through the illuminating unit, meaning a section taken in a plane which passes through the illuminating unit substantially parallel to the surface on which the vehicle rests. The illuminating unit comprises a housing 10 defined by the wall members 11 and 13, here shown as being discrete. The wall member 13 is located at the exterior of the chassis 43, 44, 45 and extends along the left side of the vehicle from the rear end towards the front end thereof. In the region of the front end of the vehicle, the wall member 13 bends around towards the right side of the vehicle so as to extend along the front end thereof. In the embodiment shown, the wall member 13 is transparent over its entire extent and may be of a type of cover glass used to cover the parking and side lights of motor vehicles. However, it is not necessary for the entire wall member 13 to be transparent, the important consideration in the present instance being that at least the portions 49 and 50 of the wall member 13 be transparent so as to enable these to constitute, respectively, a side light and a parking light for the vehicle. Thus, the portion 51 of the wall member 13 joining the portions 49 and 50 thereof need not be transparent. It is understood that the wall of the housing 10 may include wall members other than the wall members 11 and 13 shown such as, for example, horizontal wall members, e.g. one wall member above and one below the plane of the FIGURE and each extending substantially parallel thereto. Such additional wall members have been omitted here for the sake of clarity.

Sealing means, here shown as a profile washer 12, is interposed between the adjacent ends or end portions of the respective wall members 11 and 13 along the edges or edge portions of the housing 10 so that the interior 14 of the housing 10 is sealed off. The inclined section 31 of the wall member 11 is provided with an opening 15. Extending through the opening 15 and through a sealing member adjacent thereto, shown here as being a sealing disc or washer 16, is a bulb holder 17 into which is inserted a two-filament bulb 18 constituting light emitting means. The bulb 18 may be inserted into the bulb holder 17 from the interior 14 of the housing 10 in known manner. The bulb holder 17 includes a socket 19 for the bulb 18 and the socket 19 is engaged, at diametrically opposed locations thereof, by holding elements or pins 20 in bayonet-type fashion. A biasing element or spring 22 produces a force in axial direction of the socket 19 so as to urge the electrical contact member or bar 21 into engagement wherein whereby electrical contact is established between a conductor or electrode 23 fast with the contact bar 21 and the socket 19.

The bulb 18 includes a housing 24 inside of which are located two light emitters or filaments 25 and 26. The term light emitter as used herein will be taken to mean any element, such as a filament, which is capable of emitting light under the influence of a suitable exciting force, for example, an electric current. The filament 25 is located on the optical axis of the housing 24 of the bulb 18 and serves as a source of blinker light whereas the filament 26 is displaced from the filament 25 and, hence, from the optic axis of the housing 24, and provides illumination for the parking and side lights.

The wall member 11 includes a section 27 the inner surface of which, i.e. that surface of which is facing the interior 14 of the housing 10, constitutes a reflector which faces the transparent portion 49 of the wall member 13. The reflecting section 27 of the wall member 11 includes an arcuate or part-spherical portion 28 and a portion 30 provided with steps 29 which are arranged concentrically with the portion 28. The optical axis 0—0 of the reflecting section 27 extends substantially perpendicular thereto and intersects the filament 26 of the bulb 18. A support member or rib 32 is molded or otherwise secured to the wall member 11 over that region thereof including the sections 27 and 31. A reflector 33 abuts the rib 32 and substantially faces the transparent portion 50 of the wall member 13. In the region of one end or end portion of the housing 10 (the upper end of the housing 10 as seen in the FIGURE) is provided a side reflector 35 which faces the transparent portion 49 of the wall member 13. The reflector 35 includes a platelike member or plate 37, one major surface of which faces the transparent portion 49 of the wall member 13, and a support member 36 extending substantially perpendicular to the plate 37. The reflector 35 is secured to the housing 10 by means of the support member 36 which is here shown as being fast with the wall member 11 and the rib 32. Reflecting prisms 38 are provided at the rear side of the plate 37, that is, at that side of the plate 37 facing away from the transparent portion 49 of the wall member 13, and the reflecting prisms are, in turn, provided with a silver coating 39 at the rear sides thereof. It is seen that the reflector 35 is positioned so as not to interfere with the light emitted by the filaments 25 and 26 or with the light reflected by the reflectors 27 and 33.

In the region of the end or endportion of the housing 10 remote from the reflector 35 (the lower end of the housing 10 as seen in the FIGURE), the wall member 11 is indented outwardly with respect to the interior 14 of the housing 10 so as to form a step 40. A biasing or spring member 42 is secured to the rear side of the stepped section 40 of the wall member 11 by a suitable connector, here shown as a rivet or pin 41 extending through the wall member 11, the rear side of the stepped section 40 being that side facing away from the interior 14 of the housing 10. A support frame 46 having a substantially U-shaped cross-section includes a plate-like portion 47 which serves as a backing or holding plate. The support frame 46 is connected to a headlamp casing 48 via non-illustrated flanges and connecting means and the support frame 46, in turn, is supported by the supporting element 45 of the vehicle chassis. Again, the support frame 46 is secured to the supporting element 45 via non-illustrated flanges and connecting means.

The entire housing 10 is shifted so far in a direction towards the rear of the vehicle that the profile washer 12 abuts the outer plate 43 of the chassis. At the same time, the stepped section 40 of the wall member 11 is shifted towards the backing plate 47 so that the edge of the stepped section 40 located exteriorly of the housing 10 and facing the rear of the vehicle lies adjacent the edge of the backing plate 47 facing the front of the vehicle. The spring member 42 then forces the backing plate 47 into abutment with the rear surface of the wall member 11. The housing 10 is thereby, fastened to the chassis 43, 44, 45 of the vehicle. Aside from being fastened to the chassis 43, 44, 45 by means of the spring member 42 as described, the housing 10 is further secured to a non-illustrated part of the chassis by screws or the like.

The illuminating unit of the invention functions in the following manner: When the filament 25 is activated, a blinker signal is produced. The major portion of the light emitted by the filament 25 is reflected towards the front of the vehicle by the reflector 33, i.e., towards the transparent portion 50 of the wall member 13, whereas, due to the out-of-focus position of the filament 25 with respect to the reflecting section 27 of the wall member 11, only a minor fraction of the light emitted by the filament 25 is reflected towards the side of the vehicle by the reflecting section 27, i.e. towards the transparent portion 49 of the wall member 11. It will be recalled here that the filament 25 is positioned on the optical axis of the housing 24 of the bulb 18 but is spaced from the optical axis 0—0 of the reflecting section 27. On the other hand, when the filament 26 is activated, the major portion of the light emitted thereby is reflected towards the side of the vehicle by the reflecting section 27, i.e. towards the transparent portion 49 of the wall member 13, whereas a minor portion of the light emitted by the filament 26 is reflected by the reflector 33 towards the front of the vehicle, i.e. towards the transparent portion 50 of the wall member 13. It will again be recalled that the filament 26 is located on the optical axis 0—0 of the reflecting section 27 but is displaced from the optical axis of the housing 24 of the bulb 18. The side reflector 35 positioned behind the reflector 33 reflects, by means of the prisms 38 and the silver coating 39 on the rear sides thereof, only that light impinging thereon from exteriorly of the housing 10, i.e. only that light entering the housing 10 via the transparent portion 49 of the wall member 13.

It is seen that the illuminating unit of the invention achieves all of the objectives set forth in addition to providing other advantages which have now become apparent. Also, with the illuminating unit described above, a structure has been provided which is very simple to mount and which contains all of the light emitters or sources of illumination for the parking, side and blinker lights, as well as the side reflector. Furthermore, the housing of the structure serves simultaneously as a reflector.

Various modifications of the invention are possible. For example, the novel illuminating unit is not restricted for use on motor vehicles but will find a use in other applications where it is desired to provide illumination at spaced locations or over angular ranges. Also, the shape of the housing may be varied as required or desired to suit particular applications. Thus, the housing might be circular, rectangular, square, polygonal etc. or, in general, have any configuration conformable with the use. Furthermore, more than one wall member of the housing may be provided with transparent portions or be transparent over its entire extent. Although it is preferable for the reflector means to be constituted, at least in part, by the wall of the housing, this is not necessary and the entire reflector means may be discrete from and fastened to the housing in any suitable manner. The nature of the reflectors chosen for use may well depend upon the particular application as may the nature of the light emitters or sources of illumination. Of course, the number of sources of illumination contained in the housing may also vary from that described.

It will be understood that each of the elements described above, or two or more together, may also find a useful application in other types of construction and uses differing from the types described above.

While the invention has been illustrated and described as embodied in an illuminating unit, it is not intended to be limited to the details shown, since various modifications and structural changes may be made without departing in any way from the spirit of the present invention.

We claim:

1. An illuminating unit for use on motor vehicles, comprising a housing having a wall, said wall including a first section adapted to face outwardly of a motor vehicle and being provided with at least two substantially transparent portions, and a second section adapted to face inwardly of a motor vehicle and having a substantially planar surface located exteriorly of said housing; reflector means in said housing for reflecting light to at least said transparent portions, the reflected light travelling through said transparent portions to the exterior of said housing, said reflector means including a first reflector portion arranged to reflect light to one of said transparent portions, and a second reflector portion arranged to reflect light to one of said transparent portions, and a second reflector portion arranged to reflect light to the other of said transparent portions, said second reflector portion being at least in part constituted by said second section and comprising an arcuate part and a stepped part; light emitting means in said housing for directing light towards at least said first and second reflector portions; and a reflector element in said housing positioned so as to be substantially free of impingement by the light emitted by said light emitting means, said reflector element being arranged to reflect light impinging thereupon from exteriorly of said housing only and being effective for reflecting a substantial portion of the impinging light to the exterior of said housing.

2. An illuminating unit as defined in claim 1, wherein the steps of said stepped part of said second reflector portion and said arcuate part of said second reflector portion are substantially concentrically arranged.

3. An illuminating unit as defined in claim 1, wherein said reflector element comprises reflecting prisms.

4. An illuminating unit as defined in claim 1, said reflector element facing said other transparent portion.

5. An illuminating unit as defined in claim 4, wherein said reflector element has a side remote from said other transparent portion, said side being silver-coated.

6. An illuminating unit as defined in claim 1, wherein said light emitting means comprises a single light emitter so positioned that light emitted thereby impinges on both said first and said second reflector portions and is reflected to at least said transparent portions.

7. An illuminating unit as defined in claim 6, said second reflector portion having an optical axis; and wherein said light emitter is positioned on said optical axis.

8. An illuminating unit as defined in claim 6, wherein said light emitter is a filament.

9. An illuminating unit as defined in claim 6, wherein said light emitting means comprises a two-filament bulb, one of said filaments constituting said light emitter and the other of said filaments constituting a source of blinker light.

10. An illuminating unit as defined in claim 9, wherein said filaments are spaced from each other and said other filament is so positioned that at least a fraction of the light emitted thereby and reflected by said reflector means travels to each of said transparent portions.

11. An illuminating unit as defined in claim 6, further comprising a motor vehicle having a front end with said unit mounted thereon; and wherein one of said transparent portions constitutes a parking light and the other of said transparent portions constitutes a side light, said light emitter providing illumination for said parking light and said side light simultaneously.

12. In a motor vehicle, a motor vehicle body provided with a recess in the region of at least one of the corners thereof, said body including a surface which at least in part bounds said recess at a side of said recess extending in longitudinal direction of said body; and an illuminating unit mounted in said recess and comprising a housing having a wall, said wall including a first section facing outwardly of said vehicle and being provided with at least two substantially transparent portions and a second section facing inwardly of said vehicle and having a substantially planar surface matingly abutting said surface of said body, siad illuminating unit further comprising reflector means in said housing for reflecting light to at least said transparent portions, the reflected light travelling through said transparent portions to the exterior of said housing, said reflector means including a first reflector portion arranged to reflect light to one of said transparent portions and a second reflector portion arranged to reflect light to the other of said transparent portions, and said second reflector portion being at least in part constituted by said second section and comprising an arcuate part and a stepped part, said illuminating unit also including light emitting means in said housing for directing light towards at least said first and second reflector portions, and a reflector element in said housing positioned so as to be substantially free of impingement by the light emitted by said light emitting means, said reflector element being arranged to reflect light impinging thereupon from exteriorly of said housing only and being effective for reflecting a substantial portion of the impinging light to the exterior of said housing.

* * * * *